United States Patent
Robison

Patent Number: 5,779,285
Date of Patent: Jul. 14, 1998

[54] PIPE COUPLING ASSEMBLY

[75] Inventor: Dave Robison, Madison, Ohio

[73] Assignee: Perfection Corporation, Madison, Ohio

[21] Appl. No.: 607,828

[22] Filed: Feb. 27, 1996

[51] Int. Cl.⁶ .................................................. F16L 17/00
[52] U.S. Cl. ........................... 285/337; 285/343; 285/348
[58] Field of Search ................................. 285/337, 348, 285/343, 342, 382.7, 369

[56] References Cited

U.S. PATENT DOCUMENTS

| 2,779,610 | 1/1957 | Risley ........................ 285/382.7 |
| 3,069,188 | 12/1962 | Crawford .................... 285/382.7 |
| 3,879,070 | 4/1975 | Russ ........................... 285/382.7 |
| 4,070,046 | 1/1978 | Felker et al. . |
| 4,119,334 | 10/1978 | Steed . |
| 4,606,565 | 8/1986 | Royston . |
| 4,610,471 | 9/1986 | Halen, Jr. ................... 285/337 |
| 5,069,490 | 12/1991 | Halen, Jr. ................... 285/337 |
| 5,100,183 | 3/1992 | Montesi et al. ............. 285/348 |

FOREIGN PATENT DOCUMENTS

| 334380 | 9/1989 | European Pat. Off. ........ 285/337 |
| 94/10493 | 5/1994 | WIPO ........................... 285/337 |

Primary Examiner—Eric K. Nicholson
Attorney, Agent, or Firm—Fay, Sharpe, Beall, Fagan, Minnich & McKee

[57] ABSTRACT

A coupling assembly for joining two spaced coaxial pipe ends comprises an elongate sleeve adapted to receive coaxially two opposing pipe ends to be connected. The sleeve has frusto-conical ends opening outwardly and receiving a pair of annular elastomeric gaskets adapted to fit into the frusto-conical ends of the sleeve in sliding engagement around the pipe ends to be connected. A separate retaining ring member is located axially outward of each end of the sleeve to encircle the pipe ends to be connected. Each retaining ring member has a frustoconical inner wall facing the sleeve to define a gripping ring chamber. Positioned in each gripping ring chamber is a separate radially compressible gripping ring member. Separate engagement ring members are located at each end of the sleeve at a location between the elastomeric gasket and the gripping ring at that respective end. Tie rod members are provided for selectively moving the retaining ring members axially toward one another to compress the gaskets into their respective frusto-conical chambers of the sleeve and to radially compress the respective gripping ring members. And, cooperating stop surfaces act to limit movement of the retaining ring members toward one another to provide positive limit to the compression applied to the gaskets and the gripping ring members.

18 Claims, 4 Drawing Sheets

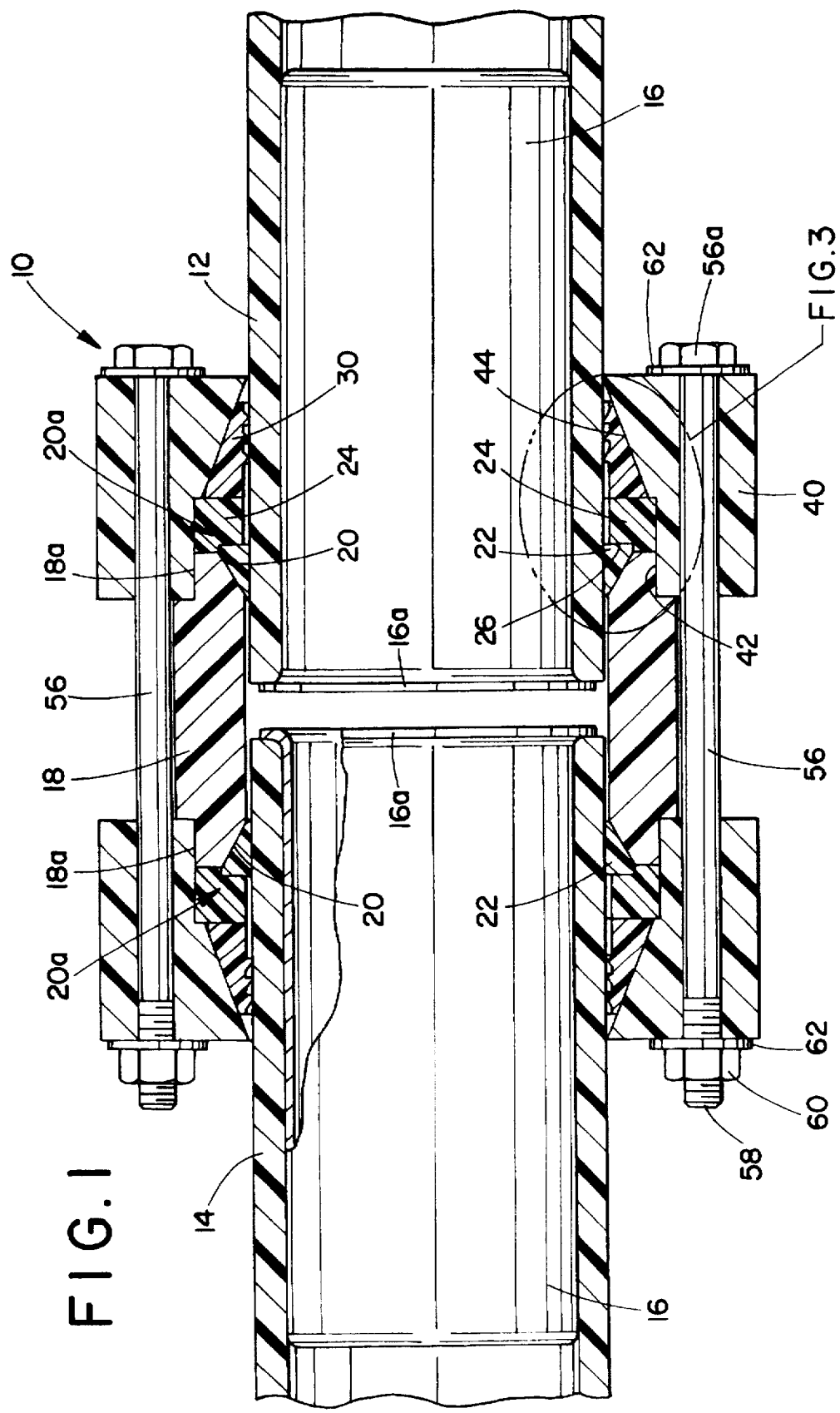

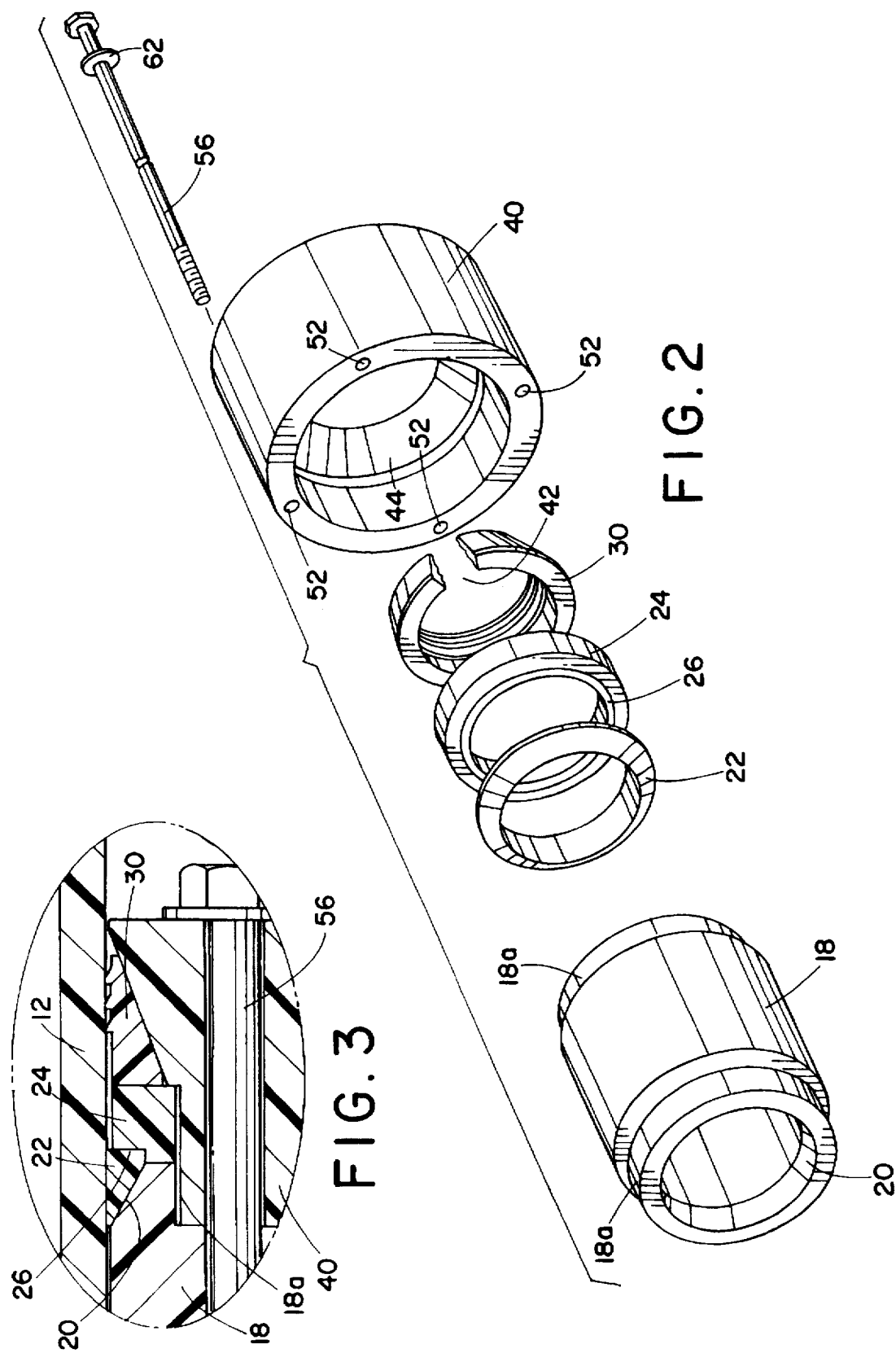

PIPE COUPLING ASSEMBLY

BACKGROUND OF THE INVENTION

The subject invention is directed toward the art of pipe couplings and, more particularly, to a coupling assembly for joining relatively large diameter pipe or tubing.

The invention is especially suited for joining plastic pipe used in gas distribution systems and will be described with reference thereto; however, as will become apparent, the invention is capable of broader application and could be used for joining other types of pipe and in a variety of different environments.

In the gas distribution industry, it is often necessary to join aligned ends of plastic pipe, as well as joining plastic pipe to metal pipe. The couplings used for this purpose must be capable of quickly being assembled to provide a perfectly sealed connection capable of resisting substantial axial pull-out loads. Further, the assembly should be capable of maintaining a leak-proof joint even if some axial creep takes place.

In addition to the above, it is highly desirable that the coupling assembly be capable of functioning in extremely corrosive environments.

SUMMARY OF THE INVENTION

The subject invention provides a pipe coupling assembly which satisfies the above needs and provides an extremely effective joint. The assembly is relatively simple to make up and can be readily disassembled if required.

In particular, and in accordance with one aspect of the invention, there is provided a coupling assembly for joining two spaced coaxial pipe ends. The assembly includes an elongated sleeve adapted to receive two coaxial opposing pipe ends to be connected. The sleeve has frusto-conical ends that open axially outward. A pair of annular elastomeric gaskets having frusto-conical end portions fit within the frusto-conical ends of the sleeve in sliding engagement around the pipe ends to be connected. A separate retaining ring member is located axially outward of each end of the sleeve to encircle the pipe ends to be connected. A frusto-conical inner wall within each retaining ring member faces the sleeve end and defines a gripping ring chamber. Positioned within each gripping ring chamber is a separate radially compressible gripping ring member. A separate engagement ring member is located at each end of the sleeve at a location between the elastomeric gasket and the gripping ring at that respective end. Tightening means are provided for selectively moving the retaining ring members axially toward one another to compress the gaskets into their respective frusto-conical chambers of the sleeve and to radially compress the respective gripping ring members into gripping engagement with the associated pipe end. In addition, cooperating stop surfaces are provided to limit movement of the retaining ring members toward one another to provide positive limits to the compression applied to the gaskets and the gripping ring members.

Preferably, the stop surfaces are provided on the engagement ring at opposite sides thereof for engagement by the respective sleeve end and the associated retaining ring member. This assures that upon make up, the proper compressive loading is applied to both the gaskets and the gripping rings. The presence of the engagement ring members and their relationship to the sleeve ends and the retaining ring members assures that the gaskets and the gripping rings are fully and properly compressed and neither is over or under compressed.

Preferably, and in accordance with a more limited aspect of the invention, each retaining ring member has an end portion that overlies and slidably receives the adjacent engagement ring member. Moreover, it is preferred that the retaining rings be received about end recesses formed circumferentially of the ends of the sleeve. Thus, when the coupling is fully made up, the gaskets, the engagement ring members, and the gripping ring members are totally enclosed by the sleeve and the associated retaining rings.

It is preferred that all of the major components of the assembly except for the gaskets be formed from relatively rigid, high strength plastic materials. This allows the assembly to function in relatively corrosive environments.

In its preferred form, the tightening means preferably comprise elongated tie rod bolts which extend axially of the assembly between the retaining ring members.

As can be seen from the foregoing, a primary object of the invention is the provision of a pipe coupling assembly which assures proper compression and engagement of the gaskets and gripping rings by providing positive limit stops on make up.

A further object of the invention is the provision of a coupling assembly of the type described wherein all major components can be formed from plastics and fiber-reinforced resinous materials.

A still further object is the provision of an assembly of the general type described wherein the gasket and gripping rings are totally enclosed when the assembly is in the made up condition.

Still another object is the provision of a pipe coupling assembly of the type described wherein make up of the assembly is relatively simple and visual external inspection allows determination as to whether or not the coupling is fully made up.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 1 is a longitudinal cross-sectional view through a coupling assembly formed in accordance with the subject invention installed on the ends of a pair of coaxially arranged pipes;

FIG. 2 is an exploded pictorial view of the right-hand end portion of the coupling assembly of FIG. 1;

FIG. 3 is a greatly enlarged view of the circled area of FIG. 1;

DETAILED DESCRIPTION OF THE PREFERRED EMBODIMENT

Figures 4, 5:
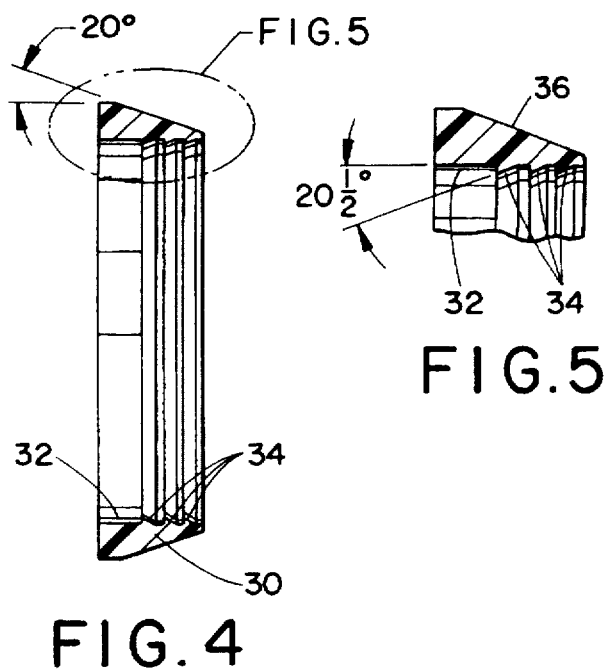
FIG. 4 is a cross-sectional view through the gripping ring member of the FIG. 1 embodiment.
FIG. 5 is an enlarged view of the circled area of FIG. 4 to better show the engagement teeth of the gripping ring.

Referring now to the drawings wherein the showings are for the purposes of illustrating the preferred embodiment of the invention only and not for purposes of limiting same, FIGS. 1-3 best illustrate the overall arrangement of a coupling assembly 10 which is shown assembled to two spaced coaxial pipe ends 12 and 14. The pipes 12, 14 are relatively large diameter plastic pipes and the assembly 10 is particularly suited for use with such pipes. Preferably, in the subject embodiment, the pipes are relatively large diameter, polyethylene pipes of the type used in gas distribution systems. It should be appreciated, however, that the assembly 10 could be used for joining plastic pipes to metal pipes and/or for joining other types of plastic pipes. In the FIG. 1 showing, each of the pipe ends 12, 14 are of cylindrical shape and are provided with a metal stiffening sleeve element 16 which is sized and arranged so as to be closely received within the respective pipe end and to be located therein by virtue of a radially extending end flange 16a that engages the end wall of the associated pipe end 12 or 14. Many different materials could be used for the stiffening sleeves but, typically, they are formed of zinc coated steel. Their primary function is to rigidify the pipe ends sufficiently to allow them to withstand the significant radial gripping forces applied by the coupling assembly 10.

The assembly 10 further comprises a relatively rigid sleeve member 18 which is of cylindrical shape and is sized so as to be closely received about the pipe ends 12, 14 as illustrated in FIG. 1. The opposite ends of the sleeve have axially outwardly open frusto-conical configurations 20 which extend inwardly and form in combination with the exterior surface of the associated pipe end 12, 14, gasket receiving chambers 20a of generally triangular cross section.

Figure 6:
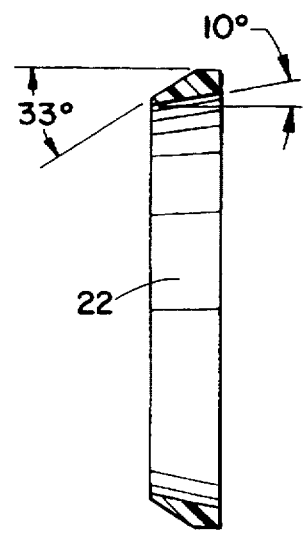
FIG. 6 is a cross-sectional view through one of the gaskets of the assembly of FIG. 1.

Positioned within the two gasket chambers 20a are separate gaskets 22 having the shape and configuration best illustrated in FIG. 6. In particular, the gaskets 22 are formed from a suitable elastomer such as a buna-nitrile and have a frusto-conical configuration generally as illustrated in FIG. 6. Although the actual shape and angular relationships could vary, in the preferred embodiment, the minor internal diameter of the gasket is sized so as to be closely similar to the outer diameter of the associated pipe with which it is to be used and in its natural, uncompressed state, flares outwardly at a 10° angle as shown. The outer surface that is adapted to be received within the gasket chamber and engaged with the frusto-conical surface 20 of the sleeve 18 preferably is inclined in the range of 33°. As noted earlier, however, these particular angles are merely preferred when using the buna-nitrile material and when the surface 20 is inclined, for example, at an angle of 30°.

Referring again to FIG. 1, it will be seen that with the gaskets 22 in position, there is an engagement ring member 24 associated with each. The engagement rings each have a generally rectangular cross section as best seen in FIGS. 1 and 3. The outer peripheral portion of one side face of the rings 24 is, however, recessed as shown at 26 so as to engage over the radial outer face of the associated gasket 22. In the preferred embodiment, the rings 24 are formed of a glass fiber reinforced polypropylene, although other materials could be used provided they had suitable strength and were compatible with the other materials used.

Located axially and radially outward of each of the engagement ring members 24 is a gripping ring member 30 that has the general shape and configuration best shown in FIGS. 2, 4, and 5. As illustrated, each gripping ring member 30 has a somewhat truncated, conical shape with an inner diameter so as to be closely receivable on the pipe ends in the manner illustrated in FIG. 1. As seen in FIGS. 4 and 5, the interior surface 32 of each ring 30 is provided with a plurality of relatively sharp gripping teeth 34 more clearly illustrated in FIG. 5. The teeth are inclined in the manner shown and have sharp outer edges. In the preferred embodiment, there are three of the teeth 34 and they have a flat face that is inclined at an angle in the range of approximately 20½°. The outer face 36 of each ring 30 is preferably inclined at an angle in the range of approximately 20° to correspond with the angle of the associated retaining ring 40 which will subsequently be described. For the present, however, it should be seen that each gripping ring 30 is shaped and positioned so as to be capable of closely engaging about the associated pipe end in the manner shown in FIG. 1. In the preferred embodiment, the gripping rings 30 are formed from a relatively hard plastic, such as an acetal copolymer. Additionally, as best seen in FIG. 2, the rings 30 are split as shown at 42 so as to be capable of undergoing radial inward compression to firmly grip the associated pipe end.

Figure 7:
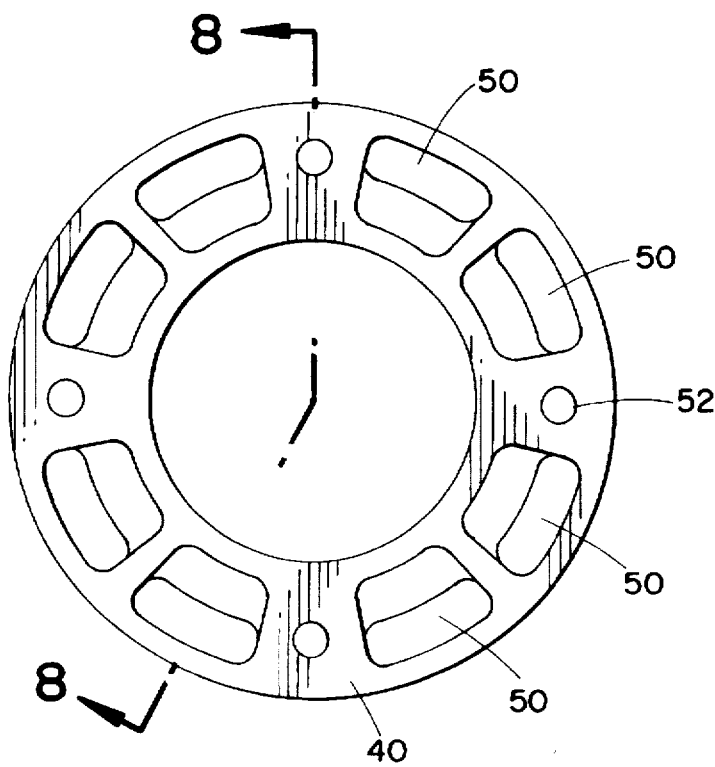
FIG. 7 is an end view of one of the retaining ring members of the FIG. 1 coupling assembly.
Figure 8:
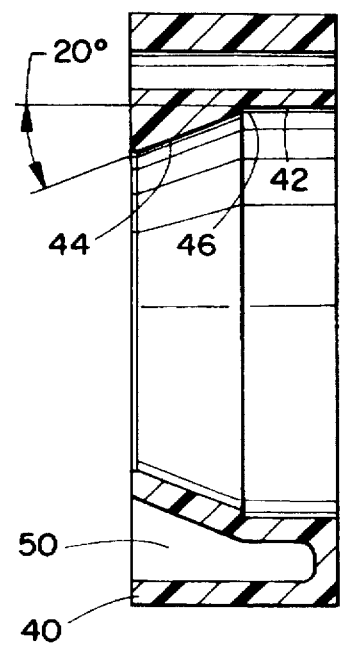
FIG. 8 is a cross-sectional view taken on line 8—8 of FIG. 7.

Adapted to be received circumferentially about the sleeve 18, the gasket 20, the engagement ring 24, and the gripping ring 30 is the previously-mentioned retaining ring member 40. Preferably, the retaining ring is glass fiber reinforced polypropylene molded to have a generally cylindrical shape best seen in FIGS. 2, 7, and 8. The retaining ring has a first cylindrical inner diameter surface 42 that is sized so as to closely receive the engagement ring 24. The ends of the sleeve 18 are provided with recesses 18a (see FIG. 1) that are also of an outer diameter so as to be closely received within the cylindrical wall 42. Located axially inward of the cylindrical wall 42 is a frusto-conical wall 44 that joins with wall 42 by a short radially extending shoulder 46. In this preferred form, wall 44 makes an angle of approximately 20° relative to the axial center line as shown in FIG. 8. This corresponds to the angle of the outer surface 36 of the gripping ring member 30.

In its preferred form, the retaining ring 40, as previously mentioned, is injection molded from a glass fiber reinforced polypropylene. In order to reduce warpage and to provide a lighter weight element, the ring is provided with a plurality of axially inward extending chambers 50 located symmetrically about the outer portion of the ring. Extending through the ring in an axial direction and located 90° apart are four through openings 52. Openings 52 provide means for applying axially directed forces to move the rings 40 toward one another to the made-up condition shown in FIG. 1. In the preferred embodiment, the rings 40 are driven toward one another by the use of suitable tie bolts 56 having threaded ends 58 receiving suitable nuts 60. Washers 62 are located under the nuts and the head 56a of each tie bolts 56. Preferably, the tie bolts 56 are formed from stainless steel or some other corrosion resistant material.

With the various components assembled into the FIG. 1 relationship, tightening of the tie bolts draws the components together causing radial compression of the gaskets 22 and the gripping rings 30. The precise amount of compression of these elements is assured by the relationship between the engagement rings 24, the sleeve 18, and the retaining rings 40. Note that the engagement rings are sized and positioned so that upon proper make up, they engage the end of the associated sleeve 18 and the shoulder 46 of the associated retaining ring 40. This provides a fixed stop so that over compression of the gaskets 22 or the gripping rings 30 is not possible. Additionally, there is a third stop surface associated with each retaining ring 40 in the form of the engagement which takes place between the inner end of each retaining ring 40 and the end wall of the associated recess 18a on sleeve 18. This surface engagement allows a visible external indication of proper make up and, when this engagement takes place, the installer is certain that simultaneous engagement has taken place on both sides of engagement ring 24 thereby assuring that the entire coupling assembly is properly installed and fully made-up.

This relationship as described above also totally encloses the gaskets and the retaining rings so that they are not significantly exposed to the surrounding environment.

Figure 9:
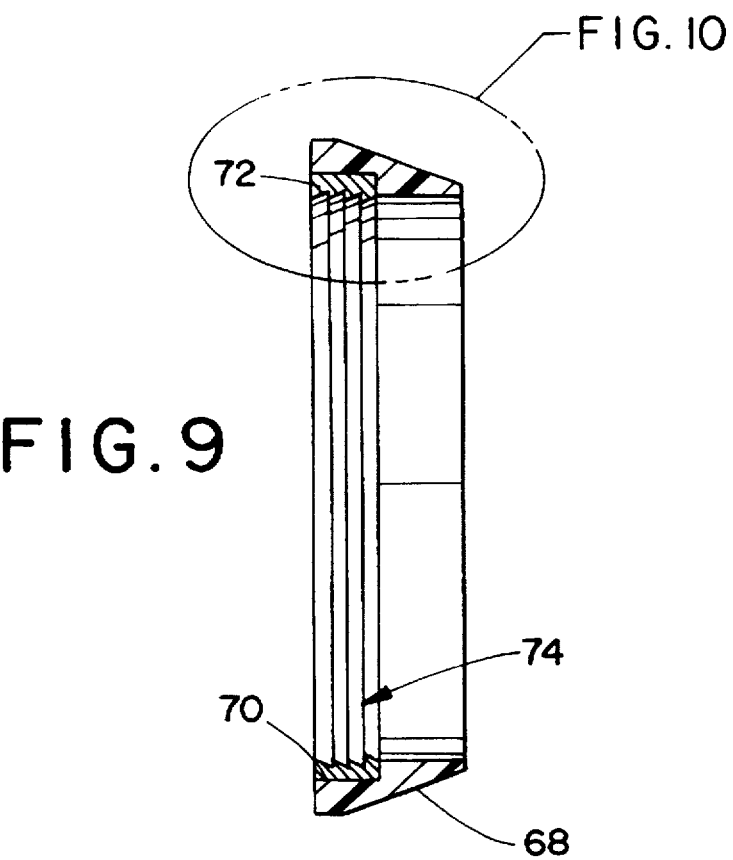
FIG. 9 is a view like FIG. 4 but showing a modified form of gripping ring.
Figure 10:
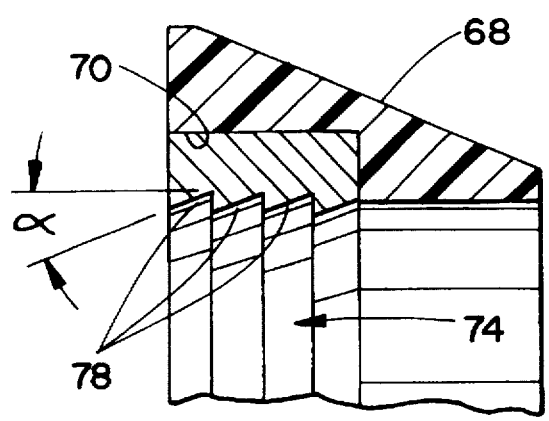
FIG. 10 is an enlarged showing of the circled portion of FIG. 9.

The gripping ring 30 of FIGS. 4 and 5 is the preferred form for use in gripping and joining plastic pipe as illustrated in FIGS. 1–3. If it is necessary to join sections of steel pipe or join a section of steel pipe to a section of plastic pipe, an alternative gripping ring construction as shown in FIGS. 9 and 10 is preferred. In particular, the alternative construction comprises a carrier ring 68 that has the radial outer configuration of the previously discussed ring 30. Carrier ring 68 can be formed of a plastic such as acetal copolymer. About the interior of ring 68 there is formed a continuous recess 70. Positioned within recess 70 is a metal ring 72 of generally rectangular cross-section provided with a toothed inner surface 74. Ring 72 is preferably formed of steel and has shaped teeth 76 formed as best seen in FIG. 10. Each tooth preferably has its inner surface inclined at an angle a in the range of 10°–15° and meets a radially extending end face at a sharp corner 78.

The ring 72 can be bonded or interference fitted within the carrier ring 68. In addition, both ring 72 and carrier ring 68 are split as shown with respect to ring 30 so that when the ring assembly is axially compressed within retaining ring 40, a radial inward gripping takes place.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A coupling assembly for joining two spaced pipe ends comprising:

an elongate sleeve adapted to receive two opposing pipe ends to be connected, said sleeve having frusto-conical ends opening outwardly;

a pair of annular elastomeric gaskets having frusto-conical end portions adapted to fit into the frusto-conical ends of the sleeve in sliding engagement around the pipe ends to be connected;

a separate retaining ring member located axially outward of each end of the sleeve and to encircle the pipe ends to be connected, each retaining ring member having a frusto-conical inner wall facing the sleeve to define a gripping ring chamber;

a separate radially compressible gripping ring member positioned in each gripping ring chamber;

separate engagement ring members located at each end of the sleeve at a location between the elastomeric gasket and the gripping ring at that respective end;

tightening means for selectively moving the retaining ring members axially toward one another to compress the gaskets into their respective frustoconical chambers of the sleeve and to radially compress the respective gripping ring members; and, cooperating stop surfaces located on the retaining ring members and engageable with stop surfaces on the associated sleeve and engagement ring for providing a fixed stop to limit movement of the retaining ring members toward one another to provide positive limit to the compression applied to the gaskets and the gripping ring members.

2. The coupling assembly as defined in claim 1 wherein each retaining ring member has an end portion that overlies the adjacent engagement ring member and slidably receives the adjacent end of the sleeve.

3. The coupling assembly as defined in claim 1 wherein the tightening means comprise tie rod members extending between the retaining ring members.

4. The coupling assembly as defined in claim 1 wherein the engagement ring members and said retaining rings are formed of a resinous material.

5. The coupling assembly as defined in claim 1 wherein said sleeve is formed of a resinous material.

6. The coupling assembly as defined in claim 1 wherein said sleeve has circumferential recesses formed about the ends radially outwardly of the elastomeric gaskets, said retaining ring members received over the recesses and slidable thereon.

7. The coupling assembly as defined in claim 6 wherein recesses define a portion of said stop surfaces to limit movement of the retaining ring members toward one another.

8. The coupling assembly as defined in claim 1 wherein each engagement ring is engaged at axially opposite sides by the respective retaining ring member and the end of the sleeve associated therewith.

9. A coupling assembly for joining two spaced coaxial pipe ends comprising:

an elongate plastic sleeve adapted to receive two coaxial opposing pipe ends to be connected, said sleeve having frusto-conical ends opening outwardly;

a pair of annular elastomeric gaskets having frusto-conical end portions positioned in the frusto-conical ends of the sleeve for sliding engagement around the pipe ends to be connected;

a separate retaining ring member located axially an radially outward of each end of the sleeve to encircle the pipe ends to be connected, each retaining ring member having a frusto-conical inner wall facing the sleeve to define a gripping ring chamber;

a separate radially compressible gripping ring member positioned in each gripping ring chamber;

separate engagement ring members located at each end of the sleeve, each engagement ring member having oppositely facing end surfaces engaged respectively with the elastomeric gasket and the gripping ring at the respective end;

tightening means for selectively moving the retaining ring members axially toward one another to compress the gaskets into their respective frusto-conical chambers of the sleeve and to radially compress the respective gripping ring members; and, further, wherein the oppositely facing end surfaces on the engagement ring members engage with cooperating stop surfaces on the associate retaining ring member, and the sleeve when the coupling assembly is connected to opposing pipe ends.

10. The coupling assembly as defined in claim 9 wherein each retaining ring member has an end portion that overlies the adjacent engagement ring member and slidably receives the adjacent end of the sleeve.

11. The coupling assembly as defined in claim 9 wherein at least one of the gripping ring members includes metal gripping teeth.

12. The coupling assembly as defined in claim 11 wherein at least one of the gripping ring members comprises a toothed metal ring in a plastic carrier ring.

13. A coupling assembly for joining two spaced pipe ends comprising:

an elongate sleeve adapted to receive two opposing pipe ends to be connected, said sleeve having frusto-conical ends opening outwardly;

a pair of annular elastomeric gaskets having frusto-conical end portions adapted to fit into the frusto-conical ends of the sleeve in sliding engagement around the pipe ends to be connected;

a separate retaining ring member located axially outward of each end of the sleeve and to encircle the pipe ends to be connected, each retaining ring member having a frusto-conical inner wall facing the sleeve to define a gripping ring chamber;

a separate radially compressible gripping ring member positioned in each gripping ring chamber;

separate engagement ring members located at each end of the sleeve at a location between the elastomeric gasket and the gripping ring at that respective end;

tightening means for selectively moving the retaining ring members axially toward one another to compress the gaskets into their respective frustoconical chambers of the sleeve and to radially compress the respective gripping ring members;

cooperating stop surfaces for providing a stop to limit movement of the retaining ring members toward one another to provide positive limit to the compression applied to the gaskets and the gripping ring members;

each retaining ring member having an end portion that overlies the adjacent engagement ring member and slidably receives the adjacent end of the sleeve; and, a stop surface on each retaining ring member and cooperating stop surfaces on the sleeve.

14. A coupling assembly for joining two spaced pipe ends comprising:

an elongate sleeve adapted to receive two opposing pipe ends to be connected, said sleeve having frusto-conical ends opening outwardly;

a pair of annular elastomeric gaskets having frusto-conical end portions adapted to fit into the frusto-conical ends of the sleeve in sliding engagement around the pipe ends to be connected;

a separate retaining ring member located axially outward of each end of the sleeve and to encircle the pipe ends to be connected, each retaining ring member having a frusto-conical inner wall facing the sleeve to define a gripping ring chamber;

a separate radially compressible gripping ring member positioned in each gripping ring chamber;

separate engagement ring members located at each end of the sleeve at a location between the elastomeric gasket and the gripping ring at that respective end;

tightening means for selectively moving the retaining ring members axially toward one another to compress the gaskets into their respective frusto-conical chambers of the sleeve and to radially compress the respective gripping ring members;

cooperating stop surfaces for providing a stop to limit movement of the retaining ring members toward one another to provide positive limit to the compression applied to the gaskets and the gripping ring members; and, said sleeve having circumferential recesses formed about the ends radially outwardly of the elastomeric gaskets, said retaining ring members received over the recesses and slidable thereon.

15. The coupling assembly as defined in claim 14 wherein recesses define a portion of said stop surfaces to limit movement of the retaining ring members toward one another.

16. A coupling assembly for joining two spaced pipe ends comprising:

an elongate sleeve adapted to receive two opposing pipe ends to be connected, said sleeve having frusto-conical ends opening outwardly;

a pair of annular elastomeric gaskets having frusto-conical end portions adapted to fit into the frusto-conical ends of the sleeve in sliding engagement around the pipe ends to be connected;

a separate retaining ring member located axially outward of each end of the sleeve and to encircle the pipe ends to be connected, each retaining ring member having a frusto-conical inner wall facing the sleeve to define a gripping ring chamber;

a separate radially compressible gripping ring member positioned in each gripping ring chamber;

separate engagement ring members located at each end of the sleeve at a location between the elastomeric gasket and the gripping ring at that respective end;

tightening means for selectively moving the retaining ring members axially toward one another to compress the gaskets into their respective frusto-conical chambers of the sleeve and to radially compress the respective gripping ring members;

cooperating stop surfaces for providing a stop to limit movement of the retaining ring members toward one another to provide positive limit to the compression applied to the gaskets and the gripping ring members; and, further, wherein each engagement ring is engaged at axially opposite sides by the respective retaining ring member and the end of the sleeve associated therewith.

17. A coupling assembly for joining two spaced coaxial pipe ends comprising:

an elongate plastic sleeve adapted to receive two coaxial opposing pipe ends to be connected, said sleeve having frusto-conical ends opening outwardly;

a pair of annular elastomeric gaskets having frusto-conical end portions positioned in the frusto-conical ends of the sleeve for sliding engagement around the pipe ends to be connected;

a separate retaining ring member located axially an radially outward of each end of the sleeve to encircle the pipe ends to be connected, each retaining ring member having a frusto-conical inner wall facing the sleeve to define a gripping ring chamber;

a separate radially compressible gripping ring member positioned in each gripping ring chamber;

separate engagement ring members located at each end of the sleeve, each engagement ring member having oppositely facing end surfaces engaged respectively with the elastomeric gasket and the gripping ring at the respective end;

tightening means for selectively moving the retaining ring members axially toward one another to compress the gaskets into their respective frusto-conical chambers of the sleeve and to radially compress the respective gripping ring members; and, further, wherein said sleeve has circumferential recesses formed about the ends radially outwardly of the elastomeric gaskets, said retaining ring members received over the recesses and slidable thereon.

18. The coupling assembly as defined in claim 9 wherein the engagement ring members and said retaining rings are formed of a resinous material.

* * * * *